United States Patent Office 2,914,427
Patented Nov. 24, 1959

2,914,427

POLYMERIC AMIDO IMIDAZOLINES AND THEIR ALKYLATION PRODUCTS, AND TEXTILES COATED THEREWITH

Emery I. Valko, Mountain Lakes, N.J., Giuliana C. Tesoro, Dobbs Ferry, N.Y., and Edward D. Szubin, Newark, N.J., assignors to Onyx Oil & Chemical Company, Jersey City, N.J., a corporation of Delaware No Drawing. Application April 13, 1956
Serial No. 577,947

16 Claims. (Cl. 117—139.5)

The invention relates to the preparation of the poly cyclization products of basic polyamides (polyamido polyimidazolines), the soluble and insoluble alkylation products of the poly cyclized polymers, and the application and use of such products as durable antistatic finishes for textile materials.

The invention includes the linear basic polyamido polyimidazolines and their soluble alkylation products, the reaction of these soluble derivatives with cross-linking divalent or polyvalent alkylating agents to form insoluble derivatives, and the products so produced; and also the treatment of textile materials with such soluble agents and the production of insoluble products by reaction with cross-linking agents, and the improved textile materials resulting therefrom.

The cyclization of basic polyamides to the polyamido polyimidazolines of the invention may be represented by the following equation and general formulas:

(1) 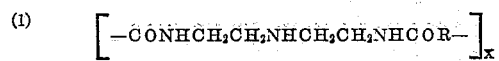

(2) 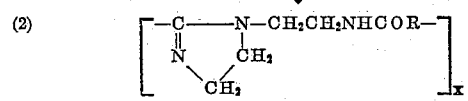

where R is a divalent radical selected from the group of substituted and unsubstituted aliphatic, aromatic, and alkylaromatic radicals, and X indicates the degree of polymerization.

The above general Formula 1 represents only the so-called repeating unit of the basic polyamide and does not contain the terminating groups. These terminating groups are usually formed by one of the components of the polycondensation reaction, which results in the formation of the polymer. Usually, the component which has been used in stoichiometric excess forms the terminating group. For instance, in Formula 1, if the acid component was used in excess, the left hand terminating group will be HOOCR—, and the right hand terminating group will be —COOH. If the basic component has been used in excess, the left hand terminating group will be

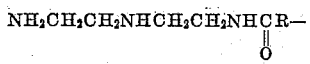

and the right hand terminating group will be

—CONHCH$_2$CH$_2$NHCH$_2$CH$_2$NH

It is, however, also possible that the two types of terminating groups are present in the same polymeric molecules. It is also possible that in the condensation reaction monofunctional acid or base has been used for the very purpose to form terminating groups and thus, to control the degree of polycondensation of the compound.

In Formula 2 the acid terminating group would be the same as stated for Formula 1 but the basic terminating group can be not only the linear form but also the cyclized group, namely on the left hand

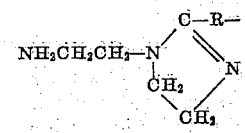

and on the right hand

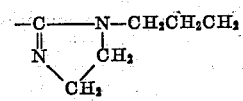

However, in Formula 2 monofunctional basic or acid radicals could likewise serve on terminating groups, if applied for this purpose in the polycondensation reaction by which the basic polyamide was prepared.

The products represented by the general Formula 2 may be converted to soluble poly quaternary ammonium compounds (Formula 3) by alkylation of the basic nitrogen atom with a suitable alkylating agent such as a halide, sulfate etc.

(3) 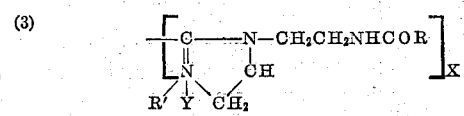

where R' is a monovalent radical selected from the group of substituted or unsubstituted alkyl or aralkyl radicals, Y is a negative ion such as halogen, sulfate, methane sulfonate and the like, and X indicates the extent of polymerization.

The cyclization of the basic polyamides of Formula 1 to produce the polyamido polyimidazolines of Formula 2 involves dehydration and removal of water with progressive cyclization which can be carried to a greater or less extent and discontinued before complete cyclization has taken place. In such cases the cyclized product may contain units of both Formula 1 and Formula 2, with the units of Formula 2 predominating.

Similarly where the cyclized product of Formula 2 and which may contain one or more units of Formula 1 are converted by alkylation to products of Formula 3, these products may also contain alkylated units of Formula 1 as well as alkylated units of Formula 2.

The units of Formula 1, without and with alkylation with a monofunctional alkylating agent, can be considered to have the following formula:

—CONHCH$_2$CH$_2$NACH$_2$CH$_2$NBCOR— where R has the meaning above indicated and A and B are selected from the group which consists of H and R'HY where R' is a monovalent radical selected from the group consisting of substituted and unsubstituted alkyl and aralkyl radicals and Y is an anion such as a halogen, sulphate, methane sulfonate and the like.

Depending upon the extent to which the cyclization is carried the cyclized product may contain units largely as indicated in Formula 2, or monoalkylated derivatives thereof, or may contain one or more uncyclized units of Formula 1 or alkylated derivatives thereof.

The products represented by the general Formula 2 can also be converted to insoluble poly quaternary ammonium compounds by alkylation of the basic nitrogen with a divalent alkylating agent such as a reactive dihalide or other diester. The insoluble compounds have groupings of the following general Formula 4 present in the molecule:

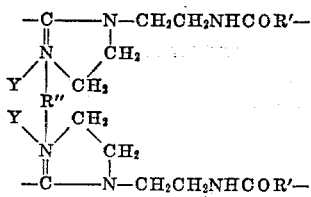

where R" is a divalent radical selected from the group of substituted or unsubstituted aliphatic or alkylaromatic radicals, and Y is a negative ion such as halogen, sulfate and the like.

These insoluble cross-linked polymers can advantageously be formed on the textile material by treating it with a solution of the soluble basic polymer represented by Formula 2 to which an appropriate amount of diester (or cross-linking agent) has been added, and heating to effect the alkylation reaction.

As indicated above, in connection with the discussion of the cyclized products containing units of Formula 2 and which may also contain one or more units of Formula 1, the products produced from Formula 2 and which may also contain one or more units of Formula 1 may be converted to insoluble products by alkylation with dialkylating agents. And the insoluble products may also have the composite structure derived from the reaction of the cross-linking dialkylating agents with the composite soluble product containing units of both Formula 1 and Formula 2.

Basic polyamides of Formula 1 suitable for cyclization to the polymeric amido imidazolines of Formula 2 may be prepared from aliphatic or aromatic, substituted or unsubstituted dibasic acids, their esters or anhydrides and from diethylene triamine.

Alkylating agents suitable for the preparation of the soluble poly quaternary ammonium compounds of Formula 3 are for instance: benzyl chloride, polyethylene glycol halohydrins, ethyl bromide, lauryl bromide and the like.

Alkylating agents suitable for the preparation of the insoluble products of Formula 4 are for instance: xylylene dichloride, glycerol dichlorohydrin, polyethylene glycol dihalides and the like.

An outstanding property of the insoluble polymers prepared by cross-linking with bifunctional alkylating agent is that they impart a durable finish to textile materials. In producing such finishes the textile material is impregnated with the solution of a mixture of the soluble linear polymer and the cross-linking agent, and the fabric is then subjected to an elevated temperature to form the finish. Thus the alkylation proceeds in situ.

This finish increases the value and usefulness of textile materials. It is known to the trade that impregnation of hydrophobic textile materials with certain compounds greatly reduces their tendency to accumulate electrostatic charges. Such compounds are commonly called antistatic agents or finishes. However, practically all these finishes are removed by laundering, or dry-cleaning or by mere rinsing with water. There is a definite need for a finish or treatment which would impart to textiles the property of dissipating electrostatic charges and which would withstand repeated laundering and dry-cleaning. Some of the compounds of the invention, when properly applied to hydrophobic textile materials act as durable antistatic finishes, extremely resistant to washing and dry-cleaning. The appearance and hand of the cloth are not unfavorably affected by the finish, and at the same time it is possible to impart a wide range of properties to the treated cloth (e.g. stiffness, softness, body) by adequately choosing the raw materials for the addition product applied.

Another extremely useful property of our new finishes is their capacity to adsorb from an aqueous bath acid dyes and to hold them. Use can be made of this property to dye economically textile materials made from hydrophobic or cellulose fibers. Hydrophobic fibers can be dyed with known methods only with the aid of high pressure or with the assistance of certain compounds called carriers or with a selected and limited group of dyes. These dye methods impose severe limitation on the selection of color and depth of color and they are usually costly. Our new finish enables the finished fabric to be dyed by members of the large group of acid or wool dyes at comparatively low cost.

APPLICATION AND TESTING

An outstanding property of the new finish is its capacity to reduce or eliminate the tendency of textile materials, consisting of or prepared from hydrophobic fibers and filaments, to accumulate electrostatic charges.

Hydrophobic fibers are synthetic fibers which have a comparatively low capacity to retain moisture in comparison with such fibers as cotton, wool and rayon. Such fibers are nylon fibers (e.g. those called nylon 66 which are prepared by condensation of 1,6-hexamethylene diamine and adipic acid; those called nylon 6 which are prepared by polymerization of caprolactam); Orlon acrylic fibers (Orlon is a trademark of the E. I. du Pont de Nemours & Co.) prepared by polymerization of acrylonitrile; Dacron polyester fibers (Dacron is a trademark of the E. I. du Pont de Nemours & Co.) prepared by condensation of terephthalic acid and ethylene glycol; cellulose triacetate fibers (marketed under the trademark Arnel by the Celanese Corporation of America); Dynel fibers (Dynel is a trademark of the Carbide & Carbon Chemical Co., a division of Union Carbide Corp.), which are copolymers of acrylonitrile and vinyl chloride; Acrilan fibers (Acrilan is a trademark of the Chemstrand Corp.) and similar synthetic fibers.

Textile materials prepared from hydrophobic fibers accumulate electrostatic charges when exposed to rubbing, e.g. in processing, where the filament or fiber and its assemblies are led over guides, or in weaving, or even in use and wear.

In processing, accumulation of electrostatic charges may cause yarn ends to stick or tangle severely on machines. Charged fabrics may attract and hold tenaciously lint and soil, and they are often difficult to cut and sew. Finished garments have a tendency to cling to the body, and spark discharges may also occur, which in some instances (such as in the operating room, in electronic research laboratories, etc.) constitute significant hazard.

The accumulation of charges is assumed to be due to the inability of the textile materials to dissipate the charges as fast as they are generated by rubbing. An adequate measure of the ability of the textile to dissipate charges is their electrical conductance (or electrical resistivity which is the reciprocal value of conductance). It is known that a specific area conductivity of the textile material higher than $10^{-12}$ reciprocal ohm (i.e. a specific area resistivity lower than $10^{12}$ ohm) is sufficient to consider the textile material as having no objectionable tendency for the accumulation of charges. A higher specific area resistance is usually indicative of the tendency to accumulate charges.

We define the specific area resistivity of the fabric as its electrical resistivity between two parallel metallic electrodes placed at a distance equal to their length. When the distance between electrodes is $n$ times higher than their length, the measured resistance must be divided by $n$ in order to obtain the specific area resistance. The instruments used to measure electrical resistance are well known (e.g. a Wheatstone bridge may be used, or a strip of fabric is placed between electrodes connected across a device for measuring electric potential (voltage) having a very high leakage resistance and a potential is then applied across the fabric; the source of potential is then disconnected from the electrodes. From the observed rate of discharge of the initial potential and from the capacitance of the system the specific area resistivity can be calculated).

The electric resistance of textile materials depends on their moisture content, which in turn is a function of the relative humidity of the surrounding atmosphere. Therefore measurement of electrical resistivity of the fabric must be carried out at a known relative humidity level, in order to give reproducible results. Most of our measurements were carried out at relative humidity between 30% and 50%.

The invention will be further illustrated by the following specific examples, but it will be understood that the invention is not limited thereto. The parts are by weight.

*Example 1*

174.2 parts of dimethyl adipate and 103.0 parts of freshly distilled diethylene triamine are mixed in a reaction vessel equipped with gas inlet tube, thermometer and mechanical stirrer and connected to a vacuum distillation apparatus. The temperature is raised to 150°, in a current of nitrogen, and methanol distills rapidly. After heating at 135°–150° for 45 minutes, 57 parts (or 89% of the calculated amount) of methanol have distilled and the reaction has become much slower. The temperature is gradually raised to 200° over a period of 1½ hours, and a further amount of methanol distills, bringing the total amount of distillate to 66 parts or somewhat more than the calculated amount. Actually, when the temperature reaches 200°, distillation of water liberated in the cyclization reaction begins, so that the distilled methanol contains some water. In order to accelerate the cyclization reaction, it is found advantageous to reduce the pressure of the system to 100 mm. of mercury, and to add a small amount (25 parts) of a water insoluble solvent such as toluene. When the reaction mixture is maintained at 180°–200° under such conditions for 4½ hours, 12.4 parts of water (or 69% of the calculated amount) are distilled. Heating is then discontinued in order to avoid decomposition. The polymeric amido imidazoline is an amber colored, hygroscopic, water soluble resin.

*Example 2*

2192 parts of adipic acid are charged in a reaction vessel equipped with mechanical stirrer and gas inlet tube and connected to a vacuum still. The adipic acid is melted in a stream of nitrogen, and 1547 parts of freshly distilled diethylene triamine are added at 130°–150° over a period of 1 hour and 40 minutes. Distillation of water begins before completing addition of the amine. When addition of the amine is completed, heating is continued at 140°–155° for 3½ hours, and during this time 400 parts of water are distilled (or 74% of the amount calculated for the formation of a non-cyclized polyamide). The temperature of the reaction mixture is then gradually raised to 200° over a period of 5 hours, and at the end of this time the total amount of water distilled is 580 parts (or 100% of the amount calculated for the formation of an acyclic polyamide, plus 15% of the amount calculated for the cyclization reaction). Upon reducing the pressure of the system to 100 mm. of mercury, and maintaining the temperature at 200°–220° for 6 additional hours, the total amount of water distilled is increased to 697 parts (58% of the amount calculated for the cyclization reaction). Heating is discontinued in order to avoid decomposition and discoloration. The product is similar in appearance and behavior to the product of Example 1.

*Example 3*

150 parts of succinic anhydride are melted in a reaction vessel equipped with mechanical stirrer and gas inlet tube and connected to a distillation apparatus. A stream of nitrogen is passed through the liquid, and 154.8 parts of freshly distilled diethylene triamine are added dropwise, while maintaining the temperature at 150°–160°. Addition requires 20 minutes. The temperature is kept at 150°–165° for 3½ hours, during which time 25.5 parts of water are distilled. Upon raising the temperature to 200°, and maintaining it at 200°–215° for 5 additional hours, the amount of water distilled is equivalent to the amount calculated for condensation plus 45% of the amount calculated for the cyclization reaction. The polymeric amido imidazoline is a brittle, hygroscopic, water soluble mass.

*Example 4*

39 parts of the polymeric amido imidazoline of Example 1 are dissolved in 100 parts of isopropanol, and 25.2 parts of benzyl chloride are added in a reaction vessel equipped with mechanical stirrer, thermometer and reflux condenser. The reaction mixture is refluxed (85°–90° reflux temperature) and the progress of the reaction is followed by argentometric titration. After 1 hour, 72% of the benzyl chloride has reacted. In order to complete the alkylation, the temperature of the reaction must be raised by removing part of the solvent.

*Example 5*

47 parts of the polymer of Example 2 are dissolved in 187 parts of isopropanol, and 60 parts of lauryl bromide are added in a reaction vessel equipped with mechanical stirrer, reflux condenser and thermometer. The mixture is refluxed (temperature 83°–85°), and the progress of the reaction is followed by argentometric titration. After 1 hour, 38% of the lauryl bromide has reacted. After 3½ hours, 52% of the lauryl bromide has reacted. A portion of the isopropanol (about 50%) is then removed, raising the reaction temperature to 95°, and heating is continued for 6 hours. At the end of this time, all of the lauryl bromide has reacted and alkylation is complete. The alcohol is distilled off at atmospheric pressure until the temperature of the residue reaches 120°. The total amount of isopropanol removed is 176 parts. The residue contains 90% polymeric amido quaternary ammonium compound and 10% isopropanol.

*Example 6*

20 parts of the condensation product of adipic acid and diethylene triamine prepared in accordance with Example 2 and 5.2 parts of dimethyl xylylene dichloride bis(chloromethyl)xylene are dissolved in 75 parts of isopropyl alcohol.

An undyed, bleached nylon fabric is impregnated with this solution on a two-roll laboratory padder. The fabric is dried for 5 minutes at 120° C. and then cured for 10 minutes at 140° C. It shows even after repeated launderings a specific area resistivity of 10" ohm, indicating a satisfactory ability to dissipate electrostatic charges.

*Example 7*

20 parts of the condensation product of adipic acid and diethylene triamine prepared in accordance with Example 2 and 10 parts of the diiodide of the polyethylene glycol of the average molecular weight of 600, having the approximate formula of

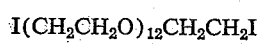

and dissolved in 70 parts of water.

This solution is used to impregnate an undyed, bleached taffeta fabric woven from Dacron polyster yarn on a laboratory two-roll padder. After drying the fabric for 6 minutes it shows a weight increase of 7.7% when compared with the untreated fabric, indicating that 107.7 parts of the treated fabric contains 7.7 parts of the reagents.

The fabric is cured in an oven at 150° C. for 10 minutes. It shows a specific area resistivity of $10^9$ ohm. After 22 launderings with a household detergent, the resistivity increased to 10" ohm, still low enough when compared with the resistivity of the untreated fabric ($10^{15}$ ohm) to indicate that the fabric has no objectionable tendency to accumulate electrostatic charges. The fabric on rubbing does not pick-up dirt readily, whereas the untreated fabric, when rubbed, readily attracts dirt particles.

The same treatment has been applied to a scoured, unbleached light weight lingerie fabrics woven from Arnel yarn. (Arnel is a trade name for a cellulose triactate manufactured by the Celanese Corporation of America.) The fabric took up 13% by weight of the reagents and after curing and 22 launderings has a specific area resistivity of $10^{11.5}$ ohm, which indicates that it can dissipate the electrostatic charges at a satisfactory rate.

The finished fabrics described above can be dyed with aqueous solutions of Azo Rhodin 2G, an acid dye, to a deep red shade, whereas the untreated fabrics remain practically untinted in the same bath.

From the foregoing description and examples it will be seen that the invention includes new polymeric amido imidazolines and their alkylation products which are water soluble and which can advantageously be used with dialkylating agents or polvalkylating agents as cross-linking agents for the finishing of hydrophobic synthetic textile fabrics and materials.

In treating such textile materials the soluble products and the cross-linking agents are advantageously separately furnished, e.g. in concentrated aqueous solution and admixed at the time of use to form an aqueous solution of proper proportions and concentration for treating the textile materials. Thus, by supplying the soluble polymeric cvclized basic polyamides in the form of a concentrated solution, and by separately supplying the dialkylating agents, in proportions suitable for admixture and use, the textile finisher can form a treating solution by adding these two reagents at the time of use to form a dilute solution suitable for treating the textile fabric or other textile material. The textile material is readily treated with the resulting solution containing the reagents therein. And after removing excess solution and drying, the curing or alkylation reaction is carried out by heating to an elevated temperature to form the insoluble cross-linked reaction product as a finish on the textile material.

The finished textile materials have the advantage above indicated of being capable of being dyed with acid dyes. They have the further advantage of having the tendency to accumulate electrostatic charges greatly reduced or eliminated.

We claim:

1. A linear basic polyamido imidazoline containing in the molecule a repeating unit of which the general formula is

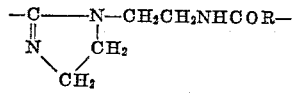

and R is a divalent radical selected from the group consisting of substituted and unsubstituted aliphatic, aromatic, and alkylaromatic radicals.

2. Imparting a durable finish to textile materials by impregnating them with an aqueous solution of a linear basic polyamido imidazoline compound of claim 1 and of a polyester of the class consisting of alkyl and aralkyl polyesters of inorganic acids capable of acting as a crosslinking agent, drying the impregnated textile material and heating it until the basic polyamido imidazoline becomes alkylated and insoluble.

3. A linear basic polyamido imidazoline containing in the molecule at least two units of the general formula

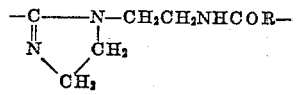

and at least one unit of the general formula

—CONHCH₂CH₂NHCH₂CH₂NHCOR— where R is a divalent radical selected from the group consisting of substituted and unsubstituted aliphatic, aromatic, and alkylaromatic radicals.

4. Imparting a durable finish to textile materials by impregnating them with an aqueous solution of a linear basic polyamido imidazoline compound of claim 3 and of a polyester of the class consisting of alkyl and aralkyl polyesters of inorganic acids capable of acting as a crosslinking agent, drying the impregnated textile material and heating it until the basic polyamido imidazoline becomes alkylated and insoluble.

5. A linear basic polyamide imidazolinium compound containing in the molecule at least two units of the general formula

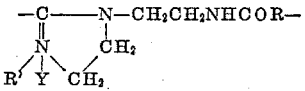

where R is a divalent radical selected from the group consisting of substituted and unsubstituted aliphatic, aromatic, and alkylaromatic radicals, R' is a monovalent radical selected from the group consisting of substituted and unsubstituted alkyl and aralkyl radicals, and Y is an anion of an inorganic acid.

6. Imparting a durable finish to textile materials by impregnating them with an aqueous solution of a linear basic polyamido imidazoline compound of claim 5 and of a polyester of the class consisting of alkyl and aralkyl polyesters of inorganic acids capable of acting as a crosslinking agent, drying the impregnated textile material and heating it until the basic polyamido imidazoline becomes alkylated and insoluble.

7. A linear basic polyamido imidazoline compound containing in the molecule at least two units of the general formula

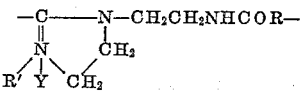

and at least one unit of the general formula

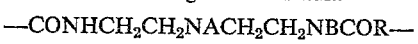

—CONHCH₂CH₂NACH₂CH₂NBCOR— where R is a divalent radical selected from the group consisting of substituted and unsubstituted aliphatic, aromatic, and alkylaromatic radicals, A and B are selected from the group of H and R'HY, R' is a monovalent radical selected from the group consisting of substituted and unsubstituted alkyl and aralkyl radicals and Y is an anion of an inorganic acid.

8. Imparting a durable finish to textile materials by impregnating them with an aqueous solution of a linear basic polyamido imidazoline compound of claim 7 and of a polyester of the class consisting of alkyl and aralkyl polyesters of inorganic acids capable of acting as a crosslinking agent, drying the impregnated textile material and heating it until the basic polyamido imidazoline becomes alkylated and insoluble.

9. A process for producing linear basic polyamido imidazoline compounds which comprises removing water from linear basic polyamides, said polyamides being prepared from diethylene triamine and a dicarboxylic acid, and continuing the removal of water until the amount of removed water is at least one third of a mol per mol of diethylene triamine combined in the linear basic polyamide.

10. An insoluble cross-linked basic polyamido imidazoline compound, said compound having groupings of the following general formula present in the molecule:

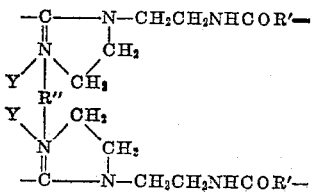

where R' is a divalent radical selected from the group of substituted and unsubstituted aliphatic aromatic and alkyl aromatic radicals, R" is a divalent radical selected from the group of substituted and unsubstituted aliphatic and alkyl aromatic radicals and Y is the negative ion of an inorganic acid, said cross-linked compound containing at least one-tenth of the available basic groups linked to the divalent R" radical in such a manner that each such divalent radical is linked to two of the basic groups.

11. Textile materials impregnated with the insoluble cross-linked compound of claim 10.

12. The process of producing alkylated liner basic polyamido imidazoline compounds which comprises removing water from linear basic polyamides, said polyamides being prepared from diethylene triamine and a dicarboxylic acid, continuing the removal of water until the amount of water removed is at least one-third of a mol per mol of diethylene triamine combined in the linear basic polyamide, and, after such removal of water, reacting the linear basic polyamido imidazoline with an alkylating agent until at least one-tenth of the basic imino and imidazoline groups are alkylated, the alkylating agent being selected from the class which consists of alkyl and aralkyl esters of inorganic acids.

13. The process according to claim 12 in which the partially alkylated derivative is further reacted with an alkylating polyester until at least one-tenth of the basic imino and imidazoline groups are alkylated and the product becomes insoluble, the alkylating polyester being a member of the group which consists of alkyl and aralkyl esters of inorganic acids having at least two ester groups in the molecule capable of alkylation.

14. The process according to claim 13 in which the alkylating polyester is a dihalide.

15. The process of producing alkylated linear basic polyamido imidazoline compounds which comprises removing water from linear basic polyamides, said polyamides being prepared from diethylene triamine and a dicarboxylic acid, continuing the removal of water until the amount of water removed is at least one-third of a mol per mol of diethylene triamine combined in the linear basic polyamide, and, after such removal of water, reacting the linear basic polyamido imidazoline with an alkylating polyester until at least one-tenth of the basic imino and imidazoline groups are alkylated and the product becomes insoluble, the alkylating polyester being a member of the group which consists of alkyl and aralkyl esters or inorganic acids having at least two ester groups in the molecule capable of alkylation.

16. The process according to claim 15 in which the alkylating polyester is a dihalide.

References Cited in the file of this patent

UNITED STATES PATENTS

| | | |
|---|---|---|
| 2,149,273 | Carothers | Mar. 7, 1939 |
| 2,200,815 | Radcliffe | May 14, 1940 |
| 2,483,513 | Allen et al. | Oct. 4, 1949 |
| 2,493,322 | Shonle | Jan. 3, 1950 |
| 2,563,289 | Steinman | Aug. 7, 1951 |
| 2,635,079 | Valko et al. | Apr. 14, 1953 |
| 2,659,681 | Weldon | Nov. 17, 1953 |
| 2,713,559 | Smith | July 17, 1955 |

UNITED STATES PATENT OFFICE
CERTIFICATE OF CORRECTION

Patent No. 2,914,427                                  November 24, 1959

Emery I. Valko et al.

It is hereby certified that error appears in the printed specification of the above numbered patent requiring correction and that the said Letters Patent should read as corrected below.

Column 2, lines 12 to 16, the formula should appear as shown below instead of as in the patent:

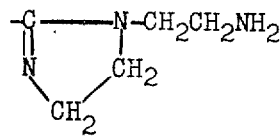

column 6, line 62, for "and" read -- are --; column 7, line 5, for "fabrics" read -- fabric --; column 9, line 12, for "liner" read -- linear --; column 10, line 16, for "esters or" read -- esters of --.

Signed and sealed this 3rd day of May 1960.

(SEAL)
Attest:
KARL H. AXLINE
Attesting Officer

ROBERT C. WATSON
                                                         Commissioner of Patents